(No Model.)
W. J. MILLER, R. S. McBEAN & J. W. McBURNETT.
VEHICLE AXLE.
No. 472,545. Patented Apr. 12, 1892.
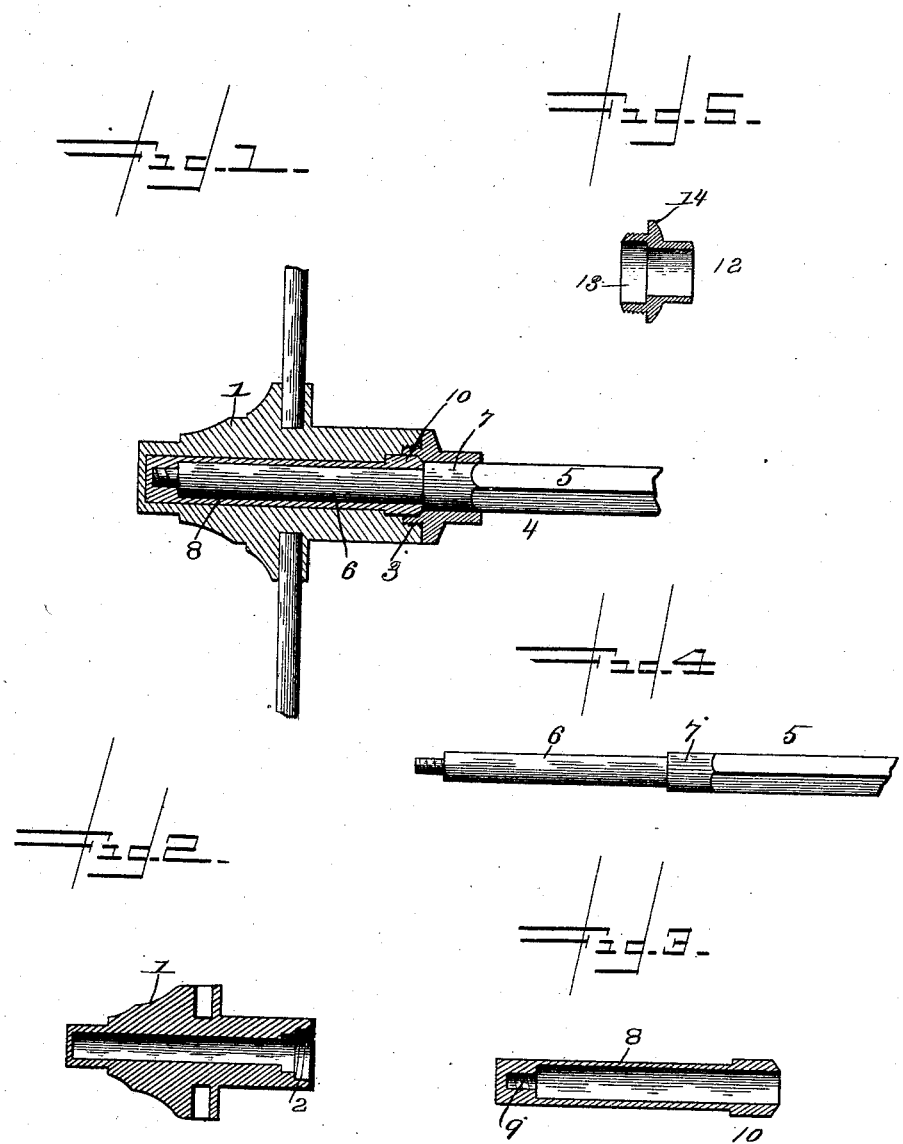
WITNESSES:
F. L. Ourand
Jo. L. Coombs
William J. Miller,
Robert S. McBean,
and John W. McBurnett,
INVENTORS,
by Sorus Dagger & Co.
Attorneys

UNITED STATES PATENT OFFICE.

WILLIAM J. MILLER, ROBERT S. McBEAN, AND JOHN W. McBURNETT, OF COLORADO, TEXAS.

VEHICLE-AXLE.

SPECIFICATION forming part of Letters Patent No. 472,545, dated April 12, 1892.

Application filed July 11, 1891. Serial No. 399,180. (No model.)

*To all whom it may concern:*

Be it known that we, WILLIAM J. MILLER, ROBERT S. McBEAN, and JOHN W. McBURNETT, all residents of Colorado city, in the county of Mitchell and State of Texas, have invented certain new and useful Improvements in Vehicle-Axles; and we do hereby declare that the following is a full, clear, and exact description of the invention, which will enable others skilled in the art to which it appertains to make and use the same, reference being had to the accompanying drawings, which form a part of this specification.

Our invention relates to improvements in vehicle-axles, the object being to provide a simple and economical device of this character, which shall possess superior advantages with respect to efficiency, and whereby sand and dirt is effectually excluded and the grease or other lubricating material prevented from escaping.

The invention consists in the novel construction and combination of parts hereinafter fully described, and specifically pointed out in the claims.

In the accompanying drawings, Figure 1 is a sectional view of a wheel and axle constructed in accordance with our invention. Fig. 2 is a detail sectional view of the wheel-hub. Fig. 3 is a similar view of the axle-skein. Fig. 4 is a side elevation of the axle. Fig. 5 is a sectional view of the nut.

In the said drawings the reference-numeral 1 designates the wheel-hub, closed at its outer end and having its inner end enlarged, forming a shoulder 2. This enlarged end of the hub is formed with interior screw-threads 3.

The numeral 4 designates the axle having the usual square or angular portion 5 and the spindle portion 6, the outer end of which is screw-threaded to engage with corresponding threads in the axle-skein hereinafter described. At the junction of the spindle with the squared portion the axle is provided with an annular collar 7.

The numeral 8 denotes the skein, consisting of a metallic tube closed at its outer end and provided with screw-threads 9, which engage with the corresponding threads on the outer end of the spindle. The inner end of the skein is formed or provided with an annular collar 10.

The numeral 12 designates a nut having a cylindrical bore and comprising the angular head adapted to engage with a wrench, a screw-threaded flange 13, which engages with the screw-threads in the inner end of the wheel-hub, and an intermediate collar 14, which abuts against the end of said hub.

In carrying the invention into effect the nut is first placed on the axle. Then the skein is placed upon the spindle and turned or rotated, so that the screw-threaded end of the spindle will engage with the screw-threads therein, the collar 7 of the axle abutting against the collar 10 of the skein. The hub is then placed on the skein, the collar 7 of the axle abutting against the shoulder 2, and the nut 12 is then screwed into the enlarged screw-threaded end of the hub, whereby it is held securely in place.

From the above it will be seen that all dust and dirt will be excluded from the device, and that there is no liability of the lubricating material escaping therefrom. The parts can be readily disconnected when desired and the wheel can be put on and taken off with ease and facility.

Having thus described our invention, what we claim is—

The combination, with a vehicle-axle comprising a square portion, a spindle screw-threaded at its outer end, and an intermediate collar, of the skein closed at its outer end and provided with interior screw-threads and formed or provided with a collar at its inner end, the wheel-hub closed at its outer end and having its inner end enlarged and provided with interior screw-threads, and the nut adapted to engage with said screw-threads in the hub, substantially as described.

In testimony that we claim the foregoing as our own we have hereunto affixed our signatures in presence of two witnesses.

WILLIAM J. MILLER.
ROBERT S. McBEAN.
JOHN W. McBURNETT.

Witnesses to signature of William J. Miller:
   J. W. NUNN,
   S. E. BOVEE.

Witnesses to signatures of Robert S. McBean and John W. McBurnett:
   BENJAMIN F. WARE,
   CLAYTON H. THOMAS.